United States Patent [19]

Barron

[11] 4,163,205
[45] Jul. 31, 1979

[54] ACOUSTO-OPTICAL DEVICE FOR REMOVING BUBBLE PULSE FROM REFLECTED SONAR SIGNAL

[76] Inventor: Daniel Barron, 6001 W. Esplanade Ave., Metairie, La. 70003

[21] Appl. No.: 872,401

[22] Filed: Jan. 26, 1978

[51] Int. Cl.$^2$ .......................... G01V 1/38; G01V 1/28
[52] U.S. Cl. ........................... 340/7 R; 340/15.5 VD; 343/100 CL; 324/77 K
[58] Field of Search ................... 340/7 R, 115.5 VD; 343/100 CL; 324/77 K

[56] References Cited

U.S. PATENT DOCUMENTS

| | | | |
|---|---|---|---|
| 3,737,573 | 6/1973 | Kessler | 178/7.5 D |
| 3,872,293 | 3/1975 | Green | 340/15.5 VD |
| 3,984,802 | 10/1976 | Lippel et al. | 324/77 K |
| 4,054,878 | 10/1977 | Diehl | 343/100 CL |

OTHER PUBLICATIONS

Jackson, "Diffractive Processing of Geophysical Data", pp. 419–427, Applied Optics, vol. 4, #4, 4/65.
Maker et al., "Large Time Bandwidth . . . Matched Filter", 6/74, pp. 1342–1344, Applied Optics, vol. 13, #6.

Primary Examiner—Nelson Moskowitz
Attorney, Agent, or Firm—Richard S. Sciascia; Harvey A. David

[57] ABSTRACT

Processing of electrical signals representative of incident and reflected acoustic signals generated by underwater explosion and comprising primary and secondary impulse, or bubble pulse, peaks. Acousto-optic diffraction and optical Fourier transform of the primary or explosive incident signal is performed and photographically recorded to provide a bubble pulse spatial filter. The filter is used in performing subsequent acousto-optic diffraction and optical Fourier transforms to derive impulse response, bottom loss, and an output electrical signal representative of the reflected signal, without the bubble pulse.

12 Claims, 2 Drawing Figures

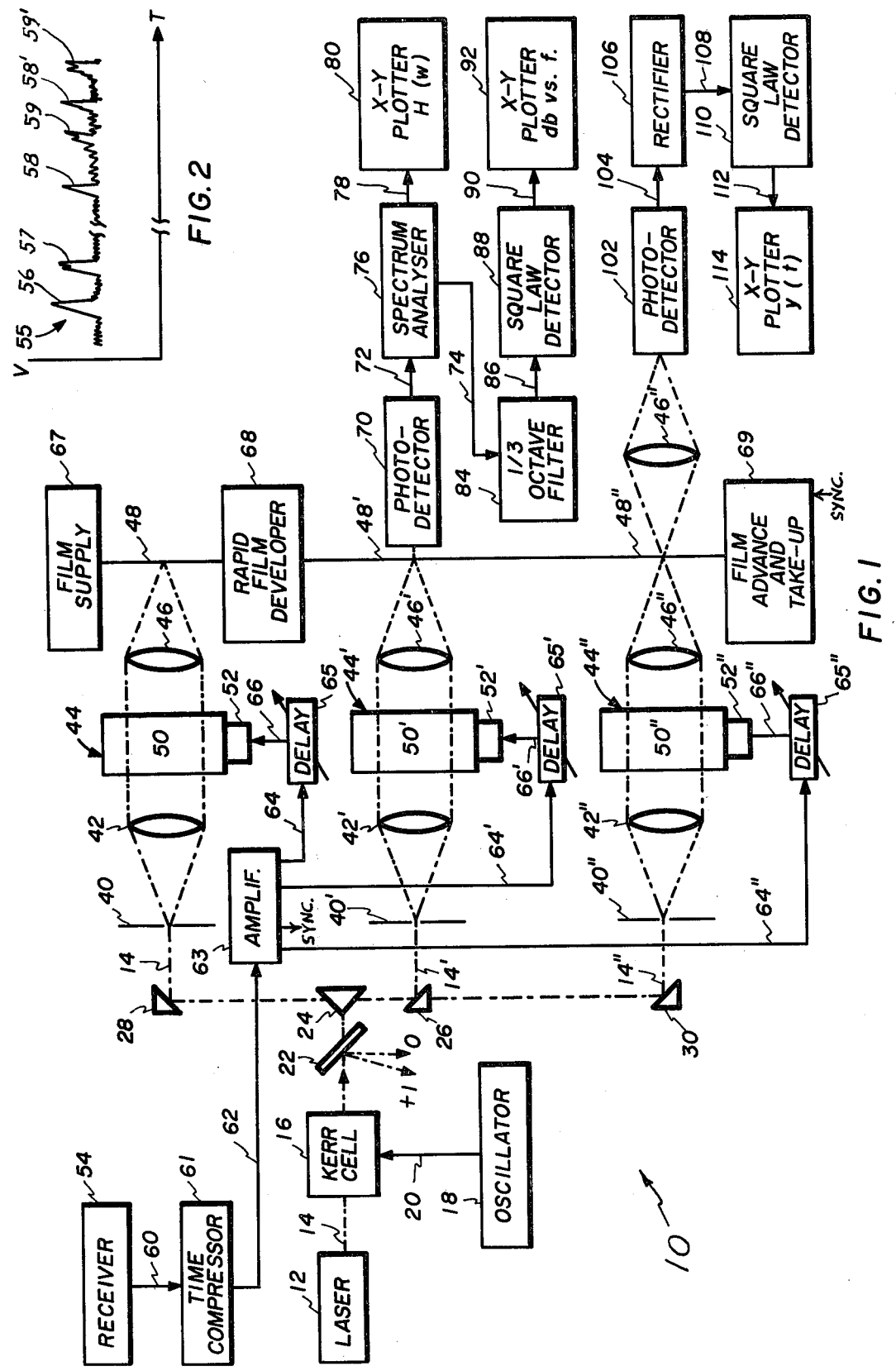

ACOUSTO-OPTICAL DEVICE FOR REMOVING BUBBLE PULSE FROM REFLECTED SONAR SIGNAL

BACKGROUND OF THE INVENTION

This invention relates generally to the art of seismic investigation of the ocean bottom and more particularly to an improved method and apparatus for processing acoustic signals to provide data from which interpretations can be made as to the geologic character of the bottom and substrata thereof, and as to effects, such as impulse response and bottom loss, on sonar transmissions.

Seismic exploration of the ocean bottom has long been carried out by explosively generating a low frequency acoustic pulse in the water and then receiving and recording, at some distance by shipboard equipment, the acoustic energy reflections from the various bottom surfaces, strata, and layer boundaries. Interpretive analysis of the recorded acoustic data has yielded information in amounts that would otherwise be virtually impossible to obtain by mechanical soundings and corings alone, although those techniques are still valuable for other purposes.

Such seismic exploration has been considerably refined over the years, particularly in the signal processing, recording, and analyzing of the acoustic returns. One of the presistent problems has been the presence of what are known as secondary or "bubble pulse" returns. The bubble pulses occur as a result of the rapid collapse of the bubble produced by the explosive charge used to generate the primary acoustic signal. These secondary bubble pulse returns can become confused with and mask primary return data. This phenomena is explained in U.S. Pat. No. 2,622,691 to J. R. Ording, which discloses a method for determining the presence of such secondary return signals.

Attempts have been made to eliminate the bubble pulse by caging the explosive shot in a perforate housing that retards the rate of bubble collapse, however the most effective solution to the problem has been to remove the secondary return signals from the recorded data by computer processing of the recorded data. Heretofore, the most effective computer processing technique for that purpose has been to perform a deconvolution of the incident and reflected pulses. This is done by tape recording the acoustic return signals, converting the signals to tape recorded digitized form and feeding them to a digital computer that does a fast Fourier transform on both the incident and the reflected signals. An inverse Fourier transform is then performed on the quotient of the Fourier transform of the reflected signal divided by the Fourier transform of the incident signal. The net result is the transfer function in the time domain or the impulse response in the frequency domain. Digital fast Fourier transform computations of the acoustic signals require complex, specialized digital electronic computers that are very expensive. Moreover, such systems are limited in bandwidth capability.

It is known that an optical lens has the inherent property of producing a Fourier transform of a signal at the focal plane of the lens, and that a beam of light can be diffracted by passage through a fluid that is subjected to acoustic energy at predetermined frequencies. Heretofore such acousto-optic systems have been used for generating holographic displays of sections of a body immersed in the fluid. Examples of this manner of ultrasonic examination of a body are found in U.S. Pat. No. 3,737,573 to L. W. Kessler, and No. 3,745,814 to D. Gabor. The latter utilizes a flexible membrane to confine the body containing acoustically excited fluid and reflected light from the membrane is modulated by deformations thereof. A correcting hologram is used in conjunction with a schlieren stop to compensate for imperfections in the shape of the membrane.

SUMMARY OF THE INVENTION

With the foregoing in mind, it is a principal object of this invention to provide an improved method and apparatus for removing or filtering bubble pulse returns from seismic data.

Another important object of the invention is to provide for the removal of secondary or bubble pulse returns in a more expeditious, effective, and efficient manner.

As another object, the invention aims to provide a novel acousto-optic apparatus for effecting a Fourier transform deconvolution of seismic data input.

Yet another object is the provision of a method and apparatus of the foregoing character that permits substantially real time processing of seismic data to remove undesired secondary returns.

Still another object is the provision of an improved method and apparatus for determination of the impulse response and bottom loss factors of seismic return data in an oceanographic seismology system.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 1 is a diagrammatic illustration of an acousto-optic apparatus embodying the invention; and FIG. 2 is a graphic illustration of acoustic signals to be processed by the apparatus of FIG. 1.

DESCRIPTION OF THE PREFERRED EMBODIMENT

Referring now to FIG. 1, the invention will be described with reference to an acousto-optic system 10 for processing direct and reflected acoustic signals generated, e.g., by an underwater explosive charge, to provide substantially real time determination of bottom loss, transfer function H(w) and the impulse response h(t) of the ocean bottom, each with secondary or bubble pulse returns effectively removed. The system 10, in this exemplary embodiment, comprises a source of coherent light. Conveniently, this source is an HeNe laser 12 providing a laser beam 14. An electro-optic shutter, or Kerr cell 16, is driven to modulate the beam 14 at a predetermined frequency, say 40 Megahertz, by an oscillator 18, the electrical output of which is connected to the cell 16 as shown by line 20.

Following the Kerr cell 16 is a mirror 22 that serves as a filter by reflecting zero order and +1 order light and allowing −1 order light to pass as the working beam. Beam splitters 24 and 26 divide the modulated −1 order light to provide two additional beams 14' and 14" with beams 14 and 14" conveniently redirected by prisms 28, 30 to be parallel to one another and to beam 14'.

The beams 14, 14' and 14" are utilized in three channels of the system 10, that is, a bubble pulse filter generating channel, a bottom loss and transfer function determining channel, and an ocean bottom impulse response determining channel. The bubble pulse filter generating channel comprises, in sequence, a spatial filter 40, a positive cylindrical lens 42, an acousto-optic modulator 44 second positive cylindrical lens 46, and a direct positive photographic film 48, lying substantially in the focal plane of lens 46.

The acousto-optic modulator 44 is of conventional construction comprising a body of light and sound wave transmitting fluid 50, such as water, disposed in a suitable container having transparent wall sections, and an electro-acoustic transducer 52 for introducing acoustic wave energy into the fluid in response to electrical signals. These electrical signals are derived from acoustic signals received along direct and reflected paths by acoustic signal receiver 54.

Referring momentarily to FIG. 2, the receiver means output signal is in the form of an electrical signal, generally indicated at 55, representing the direct and reflected acoustic signals. The directly received signals are produced by the primary explosive impulse and the following bubble pulse which are incident to reflecting bottom surfaces, substrata boundaries, and the like and produce the reflected signals. Thus, signal 55 comprises incident signals including the explosion impulse 56 and a bubble impulse 57. Of these, the explosive impulse 56 is the incident signal x(t) of interest. The signal 55 also comprises reflected signals comprising a first layer pulse 58 a first layer bubble pulse 59, a second layer pulse 58', a second layer bubble pulse 59', and so on. The reflected signals of interest y(t) are, of course, those resulting from the primary explosive impulse 56, that is, incident x(t), whereas the bubble pulses 59, 59' resulting from the secondary or bubble impulse 57 are undesirable and are sought to be removed.

The signal 55 from receiver 54 is supplied as shown by line 60 to a time compressor 61. The output of compressor 61 is fed via line 62 to an amplifier 63, the output of which is applied, as shown by line 64 to a variable delay means 65. The adjustably delayed output of delay means 65 is applied via line 66 to the transducer 52 of the acousto-optic modulator 44. Operation of the bubble pulse filter generating channel will become apparent from a later discussion of the mode of operation of the system 10 as a whole.

The second or transfer function and bottom loss determining channel employing beam 14' comprises a spatial filter 40', lens 42', acousto-optic modulator 44', lens 46', fluid 50' transducer 52', and delay means 65', all corresponding to like elements of the first channel. Similarly, the third or ocean bottom impulse response determining channel comprises corresponding elements identified by corresponding reference numerals bearing double prime marks.

The film 48 which lies substantially in the focal plane of lens 46 is adapted to be drawn from a film supply 67, through a rapid film developer 68, and across the focal planes of lenses 46' and 46" by a film advance and take-up means 69. Accordingly, developed segments 48' and 48" of film 48 become components of the second and third channels, respectively.

Disposed adjacent the film segment 48', so as to receive light passed thereby, is a photo-detector 70 capable of providing an electrical signal that is modulated in accordance with the light energy received. The photo-detector 70 has its output connected, as shown by lines 72, 74 to a frequency spectrum analyzer 76, the output 78 of which is representative of the transfer function H(w) and is conveniently recorded, and if desired displayed, by a recorder 80.

The photo-detector output on line 72 is also fed as an input to a ⅓ octave filter 84. The filtered output, line 86, of filter 84 is applied to a square law detector 88 which provides an output signal 90 representative of bottom loss in signal strength. That signal is conveniently recorded or plotted in terms of db and frequency by an xy plotter 92.

The third or bottom impulse response channel comprises an additional cylindrical lens 100 disposed between the film segment 48" and a photo-detector 102. The output of the photo-detector 102 is applied via line 104 to a rectifier 106, the rectified output voltage of which, line 108, is subject to a square law detector 110. The output of detector 110, the desired impulse response h(t), is applied as shown by line 112 to be recorded or plotted versus time by a recorder or xy plotter 114.

MODE OF OPERATION

Following detonation of an underwater seismic charge, or other manner of initiating a primary acoustic impulse, signal 55 from receiver 60 is time compressed at 61 in order to size the signal 55 so that when amplified and fed to transducers 52, 52', and 52", acoustic replicas of selected portions of the signal 55 will be reconstructed of a size that will effectively fill the illuminated zones of the bodies of fluid 50, 50', and 50" of modulators 44, 44', and 44". The delay 65, is adjusted to position the reconstructed explosive impulse incident signal x(t) in the illuminated zone of modulator 44, where it is in effect momentarily locked into the modulator 44 by the strobe effect of the laser beam 14 that is chopped, or rendered intermittent, by the kerr cell 16 at the frequency of oscillator 18.

The acoustic waves in the fluid body 50 cause diffraction of the beam 14, and the lens 46 focuses the resultant pattern on the positive direct film 48, which pattern is the inverse Fourier transform 1/X(w) of the incident signal x(t). This film segment becomes the mentioned bubble pulse filter.

The film is then advanced by the advance and take-up means 69, under control of a sync signal from amplifier 63, to bring the bubble pulse filter to the film segment 48' position in front of photo-detector 70. With the bubble pulse filter so positioned and the delay 65' adjusted so that an appropriately time compressed version of the reflected signal is positioned in the acousto-optic modulator 44', the laser beam 14' is passed through that modulator, through lens 46', and through the developed film containing the bubble pulse filter to perform Y(w)/X(w). The laser beam 14' so passing activates the photo-detector 70 to generate an electrical signal on line 72 representative of Y(w)/X(w), which equals the complex transfer function H(w). This signal is fed to the spectrum analyzer 76. If a frequency analysis of the transfer function H(w) is desired, the output of the spectrum analyzer is fed to the XY plotter 80. Bottom loss is readily determined since it is no more than the square of the magnitude of the transfer funciton. Accordingly, if the bottom loss value is desired, the spectrum analyzer output is fed via line 74 to the ⅓ octave filter 84 and square law detector 88. The integrated output is plotted on the xy plotter 92 in terms of db versus frequency.

The film 48 may then be again advanced in order to bring the bubble pulse filter recorded thereon into the position of film segment 48" at the focal plane of lens 46" of the third or impulse response determining channel of the apparatus. Delay 65" is adjusted as in the previous channel. However, the addition of lens 100 in this channel optically performs the inverse Fourier transform of the complex transfer function H(w), the result being converted from beam 14" light energy to an electrical signal by photo-detector 102. This signal is rectified by rectifier 106 integrated at 110, and plotted by xy plotter 114 in terms of h(t) versus time. This output is essentially the reflected signal y(t) without the bubble pulse.

It will be appreciated that the incident and reflected signals can be recorded on a medium such as magnetic tape for later playback and processing utilizing the method and apparatus of this invention. It will also be understood that such later processing can be done on selected signal segments at less than the substantially real time rate contemplated for the preferred embodiment described heretofore by way of example.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. Apparatus for processing first electrical signals representative of incident and reflected acoustic signals generated by an underwater explosion and characterized by unwanted incident and reflected signals as well as incident signals of interest x(t) and reflected signals of interest y(t), said apparatus comprising:
   a source of coherent light;
   shutter means for modulating said light by interruption and passing thereof at a predetermined strobe frequency;
   means for directing said light modulated by said shutter in a predetermined path;
   acousto-optical modulator means, responsive to said electrical signals, for diffracting said light in said path in accordance with said acoustic signals;
   lens means for focusing said diffracted light at a predetermined focal plane;
   direct positive photographic film means disposed at said focal plane for producing on said film means a positive photographic image of a diffraction interference pattern corresponding to the inverse Fourier transform 1/X(w) of a predetermined incident signal of interest;
   whereby said film means forms a filter such that, when directly illuminated by light diffracted by said acousto-optical modulator means in accordance with said reflected signals so as to form a diffraction interference pattern at said focal plane corresponding to the Fourier transform Y(w) of said reflected signals of interest, light is passed by said filter in accordance with Y(w)/X(w);
   whereas light forming diffraction interference patterns at said focal plane corresponding to Fourier transforms of said unwanted signals is blocked by said filter.

2. Apparatus as defined in claim 1, and further comprising:
   photo-detector means for converting light passed by said filter to second electrical signals representative of the complex transfer function H(w), where $H(w) = Y(w)/X(w)$.

3. Apparatus as defined in claim 2, and further comprising:
   spectrum analyzer means, responsive to said second electrical signals, for providing third electrical signals representing H(w) as a function of acoustic frequency.

4. Apparatus as defined in claim 1 and further comprising:
   photo-detector means disposed beyond said focal plane;
   additional lens means disposed between said focal plane and said photo-detector means so as to focus said light passed by said filter on said photo-detector means, whereby said additional lens means effects an inverse Fourier transform h(t) of H(w), where $H(w) = Y(w)/X(w)$;
   said photo detector means being responsive to said light focused by said additional lens means to provide third electrical signals representative of h(t);
   rectifier means for rectifiying said third electrical signals; and
   square law detector means, responsive to the output of said rectifier means, for providing output signals representative of reflected signals of interest y(t), free of said unwanted signals.

5. Apparatus for processing first electrical signals representative of incident and reflected acoustic signals generated by an underwater explosion and characterized by unwanted incident and reflected signals as well as incident signals of interest x(t) and reflected signals of interest y(t), said apparatus comprising:
   laser means for providing coherent light;
   shutter means for rendering said light intermittent at a predetermined strobe frequency;
   means for splitting and directing said light along a plurality of paths including at least first and second paths;
   first and second schleiren stop means disposed in said first and second paths; respectively;
   first and second lens means disposed in said first and second paths, respectively, for collimating light passed by said stops;
   first acousto-optic modulator means, responsive to said first electrical signals, for diffracting collimated light, passed by said first lens means, in accordance with said incident signal of interest x(t);
   third lens means, disposed in said first path, for focusing light diffracted by said first acousto-optic modulator means at a first focal plane;
   photographic film means, responsive to said light focused at said first focal plane, for generating a direct positive image transparency of a diffraction interference pattern corresponding to the Fourier transform X(w) of said incident signal of interest x(t);
   second acousto-optic modulator means, responsive to said electrical signals, for diffracting collimated light, passed by said second lens means, in accordance with said reflected signals;
   fourth lens means, disposed in said second path, for focusing light diffracted by said second acousto-optic modulator means at a second focal plane to form a diffraction interference pattern corresponding to the Fourier transform Y(w) of said reflected signal of interest;

means for positioning said transparency at said second focal plane whereby light in said second path is passed by said transparency in accordance with Y(w)/X(w); and first photo-detector means, responsive to said light passed by said transparency, for generating second electrical signals representative of the complex transfer function H(w), where $H(w)=Y(w)/X(w)$.

6. Apparatus as defined in claim 5, wherein said plurality of paths comprises a third path, said apparatus further comprising:

third schlieren stop means, disposed in said third path;

fifth lens means, disposed in said third path, for collimating light passed by said third stop means;

third acousto-optic modulator means, responsive to said first electrical signals, for diffracting collimated light, passed by said fifth lens means, in accordance with said reflected signals;

sixth lens means, disposed in said third path, for focusing light diffracted by said third acousto-optic modulator means at at a third focal plane;

means for positioning said transparency at said third focal plane, whereby light in said third path is passed by said transparency in accordance with H(w);

sixth lens means, disposed in said third path, for focusing light passed by said transparency at a fourth focal plane and effecting the inverse Fourier transform h(t) of H(w);

second photo-detector means, responsive to light focused at said fourth focal plane, for generating third electrical signals representative of h(t).

7. Apparatus as defined in claim 6, and further comprising:

rectifier means, responsive to said third electrical signals, for rectifying said third electrical signals to provide fourth electrical signals;

square law detector means, responsive to said fourth electrical signals, for squaring h(t) to provide fifth electrical signals representative of y(t).

8. Apparatus as defined in claim 7, and further comprising:

spectrum analyzer means, responsive to said second electrical signals, for providing sixth electrical signals corresponding to H(w) as a function of frequency.

9. Apparatus as defined in claim 8, and further comprising: ⅓ octave filter means, responsive to said sixth electrical signals; and square law detector means, responsive to said seventh electrical signals, for providing eighth electrical signals representative of bottom loss as a function of frequency.

10. Apparatus as defined in 9, and further comprising:

a supply of said photographic film;

fast film processing means disposed between said first and second paths and operative to develop said film; and said means for positioning said film comprising film advance and take-up means for moving said film successively through said first focal plane, said processing means, said second focal plane, and said third focal plane.

11. Apparatus as defined in claim 10, and further comprising:

amplifier means for amplifying said first electrical signals; and first, second, and third delay means, for introducing first, second, and third time delays in said first electrical signals prior to application thereof to said first, second, and third acousto-optic modulators, respectively, whereby replications of selected portions of said incident and reflected acoustic signals are positioned in said acousto-optic modulators in predetermined time relation to positioning of said photographic film and transparency.

12. Apparatus as defined in claim 11, and further comprising: receiver means for receiving said acoustic signals and generating said first electrical signals;

time compression means for time compressing the output of said receiver means so that said replications of said acoustic signals fit said acousto-optic modulators.

* * * * *